April 19, 1960   W. BEUERMANN   2,933,715
SEISMIC DEVICE
Filed April 19, 1957
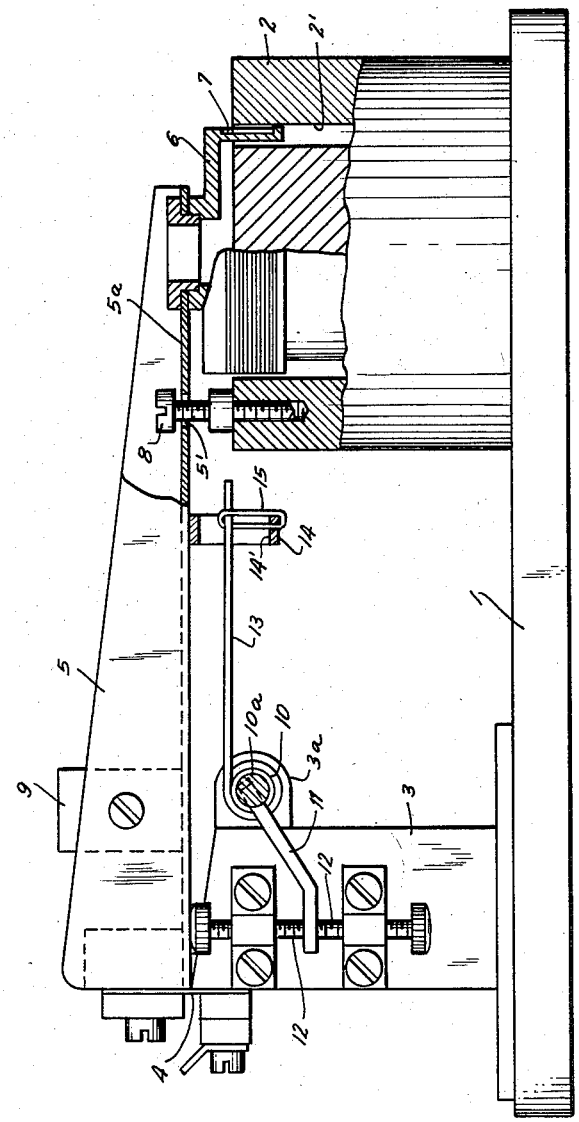
INVENTOR.
Wilhelm Beuermann
BY
Michael S. Striker
Agt.

United States Patent Office 2,933,715
Patented Apr. 19, 1960

2,933,715

SEISMIC DEVICE

Wilhelm Beuermann, Hannover, Germany, assignor to Firma Seismos, Gesellschaft mit beschränkter Haftung, Hannover, Germany Application April 19, 1957, Serial No. 654,023

Claims priority, application Germany April 21, 1956

7 Claims. (Cl. 340—17)

The present invention relates to a seismic device.

More particularly, the present invention relates to a seismic device capable of detecting earth tremors.

There exist seismic devices which incorporate a moving coil that cooperates with a stationary pot magnet, the arrangement of the parts being such that during an earth tremor a mass or weight is relatively stationary whereas the coil moves relative to the magnet thereby generating an electric voltage which is amplified and fed to a recording device. It has been found, however, that existing devices possess an excessively high natural frequency so that it is not possible to detect and measure tremors of very low frequencies, such as 1 to 5 cycles per second.

It is therefore an object of the present invention to provide a seismic device which overcomes the above disadvantages.

It is another object of the present invention to provide a seismic device which is extremely sensitive and capable of detecting tremors of very low frequency, and which also possesses excellent damping characteristics.

The objects of the present invention also include the provision of a seismic device which is sturdy, which may readily be used in the laboratory as well as in the field, and which may be constructed and maintained at very low cost.

With the above objects in view, the present invention mainly consists in a seismic device wherein a seismoresponsive member having a low natural frequency is movably connected to support means. More particularly, the seismic device includes support means, an elongated carrier, leaf spring means connected to the carrier at a first point thereof for swingably mounting the carrier on the support means, a weight carried by the carrier at a second point thereof, motion-responsive means carried by the carrier at a third point thereof which is spaced a greater distance from the first point that the second point is spaced from the first point, and torsion spring means operatively connected to the carrier for imparting to the assembly consisting of the spring-mounted carrier, the weight and the motion-responsive means a natural frequency of the order of approximately 3 cycles per second. According to one embodiment of the present invention, the motion-responsive means include a moving coil which is adapted to cooperate with a pot magnet.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the single figure is a diagrammatic elevational view, partly in section, of one embodiment of a seismic device according to the present invention.

The figure shows the seismic device as including a support base 1 carrying a pot magnet 2 and an upright 3. An elongated channel-shaped carrier lever 5 is swingably mounted on the upright 3 by means of a leaf spring 4 which is attached to the carrier 5 at one end thereof. The carrier 5 carries at its other end a tubular core 6 upon which a coil 7 is wound; the arangement of the parts being such that the core and coil 6, 7 extend into the annular gap 2' of the pot magnet 2 so that the coil 7 is freely movable relative to the pot magnet.

The coil 7 and the pot magnet 2 act as a motion-responsive means in that relative movement between the coil and the magnet will cause a voltage to appear across the coil. This voltage may then be amplified and supplied to a suitable recording device (not shown).

An adjustable abutment screw 8 is provided the shank of which extends through an opening 5' in the base 5a of the carrier 5. In this way, the swing of the carrier 5 as well as the depth which the coil 7 may dip into the pot magnet 2 may be limited.

The carrier 5 also carries a mass or weight element 9. The latter is preferably of lead or other heavy material, whereas the carrier 5 as well as the core 6 of the coil 7 are made of very light material, such as aluminum or a suitable plastic. As may readily be seen from the drawing, the weight 9 is arranged closer to the end of the carrier 5 at which the same is attached to the leaf spring 4 than to the opposite end, so that the distance between the coil 7 and the weight 9 is greater than the distance between the weight 9 and the point at which the carrier 5 is attached to the spring 4. The carrier 5 thus acts as a connecting means which interconnects the support 1, 3, the weight 9 and the coil 7 in such a manner that relative movement of a certain magnitude between the support 1, 3 and the weight 9 causes a greater relative movement between the coil 7 and the pot magnet 2 carried by the support 1. This has the effect of multiplying the sensitivity of the seismic device by a factor equal to the ratio between the distance the weight 9 and the coil 7 are spaced from each other and the distance which the weight 9 is spaced from the attachment point of the carrier 5. In practice, this ratio may be of the order of approximately 4:1.

By virtue of this arrangement, when a tremor causes movement of the support 1, 3 relative to the weight 9, the latter tending to remain stationary due to its inertia, the movement between the coil 7 and the pot magnet 2 will be approximately four times as great, depending upon the point along the carrier 5 at which the weight 9 is located.

In addition to increasing the sensitivity of the seismic device, the damping effect obtained by the interaction between the coil 7 and the pot magnet 2 is likewise increased. This is so inasmuch as the flow of eddy currents is a function of the amplitude of the relative movement between the coil and the magnet, and the amplified movement causes the flow of more eddy currents than non-amplified movement would cause, thereby damping the swing of the carrier 5.

According to the present invention the seismic device further includes a torsion spring 10 the coils of which are arranged about a pin 10a turnably carried by ears 3a of the upright 3, one end of the spring 10 being received in a slot formed in the pin thereby preventing turning of the spring relative to the pin. A lever 11 is firmly connected to the pin, and the free end of the lever extends between two adjustment screws 12.

The spring 10 is formed with a straight end portion 13 which projects through a yoke 14 rigidly connected to the carrier 5. A wire or string loop 15 passes over the end portion 13 and through an aperture 14' of the yoke 14 so that the carrier 5 is suspended by the spring 10, the adjustment screws 12 being so set that the lever 11 holds the spring 10 in a position wherein the carrier 5 is suspended in the position shown in the figure, i.e., in a position wherein the carrier 5 touches neither the upper nor the lower portion of the abutment 8.

The spring 10 is so selected that it imparts to the assembly consisting of the carrier 5, the weight 9 and that part of the motion-responsive means which incorporates the core 6 and the coil 7 a low natural frequency, preferably one which is not greater than approximately 3 cycles per second, and, more particularly, one which is of the order of approximately 3 cycles per second. The seismic device is thus capable of detecting and responding to earth tremors of very low frequencies, such as 1 to 5 cycles per second.

It will be understood that each of the elements described above, or two or more together, may also find a useful application in other types of seismic devices differing from the types described above.

While the invention has been illustrated and described as embodied in a seismic device for detecting earth tremors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a seismic device, in combination, support means; elongated carrier means; leaf spring means attached to said carrier means at a first point thereof spaced from the center of gravity thereof for swingably mounting said carrier means on said support means; motion-responsive means carried by said carrier at a second point thereof which is spaced a greater distance from said center of gravity of said carrier means than said first point is spaced from said center of gravity; and spring means operatively connected to said carrier means for imparting to the assembly consisting of said spring-mounted carrier means and said motion-responsive means carried thereby a natural frequency of the order of approximately 3 cycles per second.

2. In a seismic device, in combination, support means; an elongated carrier; mounting means connected to said carrier at a first point thereof for swingably mounting said carrier on said support means; a weight carried by said carrier at a second point thereof; motion-responsive means carried by said carrier at a third point thereof which is spaced a greater distance from said first point than said second point is spaced from said first point; and spring means operatively connected to said carrier for imparting to the assembly consisting of said carrier, said weight and said motion-responsive means a natural frequency of the order of approximately 3 cycles per second.

3. In a seismic device, in combination, support means; an elongated carrier; leaf spring means attached to said carrier at a first point thereof for swingably mounting said carrier on said support means; a weight carried by said carrier at a second point thereof; motion-responsive means carried by said carrier at a third point thereof which is spaced a greater distance from said first point than said second point is spaced from said first point; and torsion spring means operatively connected to said carrier for imparting to the assembly consisting of said spring-mounted carrier, said weight and said motion-responsive means a natural frequency of the order of approximately 3 cycles per second.

4. In a seismic device, in combination, support means; an elongated carrier; leaf spring means attached to said carrier at a first point thereof for swingably mounting said carrier on said support means; a weight carried by said carrier at a second point theeof; motion-responsive means carried by said carrier at a third point thereof which is spaced a greater distance from said first point than said second point is spaced from said first point, said motion-responsiev means including a moving coil adapted to cooperate with a pot magnet; and torsion spring means operatively connected to said carrier for imparting to the asesmbly consisting of said spring-mounted carrier, said weight and said coil a natural frequency of the order of approximately 3 cycles per second.

5. In a seismic device, in combination, support means; an elongated carrier; leaf spring means attached to said carrier at a first point thereof for swingably mounting said carrier on said support means; a weight carried by said carrier at a second point thereof; motion-responsive means carried by said carrier at a third point thereof which is spaced a greater distance from said first point than said second point is spaced from said first point, said motion-responsive means including a moving coil adapted to cooperate with a pot magnet; torsion spring means operatively connected to said carrier for imparting to the assembly consisting of said spring-mounted carrier, said weight and said coil a natural frequency of the order of approximately 3 cycles per second; and means operatively associated with said torsion spring means for adjusting the force exerted thereby on said carrier.

6. In a seismic device, in combination, support means; an elongated carrier; leaf spring means attached to said carrier at a first point thereof for swingably mounting said carrier on said support means; a weight carried by said carrier at a second point thereof; motion-responsive means carried by said carrier at a third point thereof which is spaced a greater distance from said first point than said second point is spaced from said first point, said motion-responsive means including a moving coil adapted to cooperate with a pot magnet; torsion spring means operatively connected to said carrier for imparting to the assembly consisting of said spring-mounted carrier, said weight and said coil a natural frequency of the order of approximately 3 cycles per second; and abutment means adapted to cooperate with said carrier for limiting the swing thereof.

7. In a seismic device, in combination, support means; an elongated carrier; leaf spring means attached to said carrier at a first point thereof for swingably mounting said carrier on said support means; a weight carried by said carrier at a second point thereof; motion-responsive means carried by said carrier at a third point thereof which is spaced a greater distance from said first point than said second point is spaced from said first point, said motion-responsive means including a moving coil adapted to cooperate with a pot magnet; torsion spring means operatively connected to said carrier for imparting to the assembly consisting of said spring-mounted carrier, said weight and said coil a natural frequency of the order of approximately 3 cycles per second; and abutment means adapted to cooperate with said carrier for limiting the depth which said moving coil may dip into the pot magnet.

References Cited in the file of this patent

UNITED STATES PATENTS

| | | |
|---|---|---|
| 1,784,415 | Benioff | Dec. 9, 1930 |
| 2,269,453 | Gayhart | Jan. 13, 1942 |
| 2,348,225 | Petty | May 9, 1944 |
| 2,576,775 | Case | Nov. 27, 1951 |
| 2,683,867 | Van | July 13, 1954 |
| 2,756,406 | Schurman | July 24, 1956 |
| 2,788,512 | Reichert | Apr. 9, 1957 |